United States Patent [19]

Sanders

[11] Patent Number: 5,036,406
[45] Date of Patent: Jul. 30, 1991

[54] METHOD AND APPARATUS FOR OBTAINING IDENTICAL OUTPUT SIGNAL FROM NOMINALLY IDENTICAL TIME BASE CORRECTOR UNIT HAVING SLIGHTLY DIFFERENT CHARACTERISTICS

[76] Inventor: Glenn Sanders, 17-12 Bellaire Ave., Fairlawn, N.J. 07410

[21] Appl. No.: 482,631

[22] Filed: Feb. 21, 1990

[51] Int. Cl.$^5$ .................. G11B 5/02; H04N 5/78; H04N 17/02
[52] U.S. Cl. .................................. 360/25; 360/27; 360/36.2; 358/10
[58] Field of Search ............... 360/25, 27, 65, 67, 360/36.2; 358/10, 335

[56] References Cited

U.S. PATENT DOCUMENTS 4,583,134  4/1986  Nakamichi ................. 360/27 X
4,706,108  11/1987  Kumagai et al. ................. 358/10

OTHER PUBLICATIONS

Sadashige; "Overview of time-base connection techniques and their applications"; SMPTE; Journal vol. 85, No. 10, pp. 787-791; Oct. 76.

Primary Examiner—John H. Wolff
Assistant Examiner—Varsha V. Sheladin
Attorney, Agent, or Firm—Abelman Frayne Rezac & Schwab

[57] ABSTRACT

A standard reference video tape, a source of a standard reference video signal and a source of a variable offset signal are adapted for use with a plurality of time base corrector units. Each unit is capable of playing a video tape to produce a corresponding video output signal containing various viewing parameters such as video gain, chroma gain, set up and hue, the viewing parameters having values which can be varied. The units have slightly different electrical characteristics so that when each of these units is caused to play the same tape at identical parameter values, the video output signals will differ from unit to unit. The referene tape is played in one of the units having parameter values preset for use with this tape, thereby producing a video output signal containing all parameters. The output signal is played together with the reference signal, the reference signal containing the same parameters but with different values. An offset signal is applied to the input of said one unit. The offset signal is varied to vary the video output signal for each parameter in turn until each parameter of the varied output signal is visually identical to that of the standard reference signal, thereby obtaining a set of offset signal values, each value in the set being associated with a different parameter. Data which is monatonically related to the value of the set offset signal values producing said visual identity and uniquely identifying the unit with which this set is associated is obtained and stored in an offset memory.

8 Claims, 4 Drawing Sheets

METHOD AND APPARATUS FOR OBTAINING IDENTICAL OUTPUT SIGNAL FROM NOMINALLY IDENTICAL TIME BASE CORRECTOR UNIT HAVING SLIGHTLY DIFFERENT CHARACTERISTICS

BACKGROUND OF THE INVENTION

A time base corrector [TBC] unit is a video processing device. It is a unit which can be built into a video tape recorder or can be used separately with such recorder. When video tapes are edited, the tapes must be played. Each time a tape is played on a video tape recorder, it is necessary to adjust several parameters of the associated TBC, such as video gain, chroma gain, setup and hue, so that the values of these parameters used in playing the tape the first time will be unaltered when the tape is played again. If the values are changed, the tape cannot be properly edited.

All TBC units are nominally identical. However, because of manufacturing tolerances and the like, no two units have identical electrical characteristics so that parameter settings used for play of one tape on one unit will differ from the settings needed to play the same tape on another unit in such manner that the tape can be properly edited.

The present invention is directed toward both a new and improved method and a new and improved apparatus for enabling a tape to be played for editing on any one of a plurality of TBC units without changing parameter settings each time this tape or any other tape is to be so played.

SUMMARY OF THE INVENTION

It is an object of the present invention to provide a new and improved method and new and improved apparatus for enabling a tape to be played for editing on any one of a plurality of TBC units without changing parameter settings each time this tape is to be played.

Another object is to provide both a new and improved method and new and improved apparatus for using a standard tape and a standard reference signal to obtain stored data for electrically adjusting the video outputs of all TBC units so that all tapes can be played in the same manner on all units without separate setting adjustments.

Yet another object is to provide both a new and improved method and new and improved apparatus for storing and accessing in one memory offset signal data which can be used to adjust the video output of any TBC unit to conform to the same standard, thereby eliminating changes in video output in different TBC units which are caused by different electrical characteristics of the different units.

Still another object is to provide both a new and improved method and new and improved apparatus utilizing for storage and access one memory containing offset signal data for each TBC unit and a second memory containing properly adjusted tape data for each tape used whereby using data from both memories any tape can be played in any unit in the same manner without any further adjustments.

These and other objects and advantages of this invention will either be explained or will become apparent hereinafter.

In accordance with the principles of this invention, both the method and the apparatus employ a standard reference video tape, a source of a standard reference video signal and a source of a variable offset signal. The method and apparatus are adapted for use with a plurality of TBC units. Each unit is capable of playing a video tape to produce a corresponding video output signal having various viewing parameters such as video gain, chroma gain, set up and hue. The viewing parameters have adjustable values which are set for each unit by applying appropriate parameter setting signals to an input of the unit. The units have slightly different electrical characteristics so that when each of these units is caused to play the same tape at identical parameter values, the video output signals will differ from unit to unit.

In order to utilize the invention, the reference tape is first played in one of the units having parameter values which are preset for use with this tape, thereby producing a video output signal which contains all of the parameters.

This signal is displayed visually together with the reference signal, these signals differing visually one from the other.

The offset signal is applied to the input of the selected unit and the value of the offset signal is changed to vary the video output signal until the output signal is visually identical to the standard reference signal. More particularly, this process is used to correct each of the four parameters in turn whereby four offset signal values form a set of offset signal values. Data which is monatonically related to the set of offset signal values producing the visual identity and which uniquely identifies the unit with which this set of offset signal values is associated is obtained and stored in an offset signal memory. This process is repeated until sets of offset signal values for each of the units are dealt with in the same manner and the corresponding data is stored in the offset signal memory.

However, any video tape other than the standard reference tape will produce video output signals which will have viewing parameters which differ from that of the standard tape. Additional adjustments must be made to insure that any tape can be played on any one of the units using the offset signal values associated with the one unit to produce the same output signals as when the same tape is played on another unit using the offset signal values associated with this other unit.

To this end, a second tape is played in a selected unit. This second tape, as is also the case for any other tape other than the standard reference tape, contains test patterns displayed initially when the tape is played. These patterns are used to determine the four parameter values to be used in viewing the tape whereby another video output signal is produced.

These patterns are displayed visually together with the same standard reference signal used in determining the offset signal values. The offset signal values associated with the selected unit are then applied to its input, and the value of each parameter in turn is varied, in the presence of the offset signal value associated with the particular parameter being varied, until this parameter is identical with the same parameter of the reference signal. As a result, a set of four parameter values adjusted to be identical in the presence of the corresponding offset signal values to the corresponding reference signal value are obtained.

Data which is monatonically related to the set of parameter values of this particular tape and uniquely identifies the tape with which this set is associated is obtained and stored in a tape memory.

Then, by using data obtained from both memories, the second tape can be played on any of the units and the video output signal will always be the same. The steps used in obtaining the set of parameter values for the second tape should be repeated with each additional tape so that the combination of offset signal memory and tape memory can be used to enable any tape so processed to be played on any of the units with identical results.

Stated differently, the data for all the units and all of the tapes is thus stored in memory and can be recalled and used by a microcomputer or discrete logic to enable all units regardless of differences in electrical characteristics to play any of the tapes on any of the TBC units and the tapes can be properly edited without having to adjust the parameter values of the selected unit in any way.

DETAILED DESCRIPTION OF PREFERRED EMBODIMENTS

Figure 1:
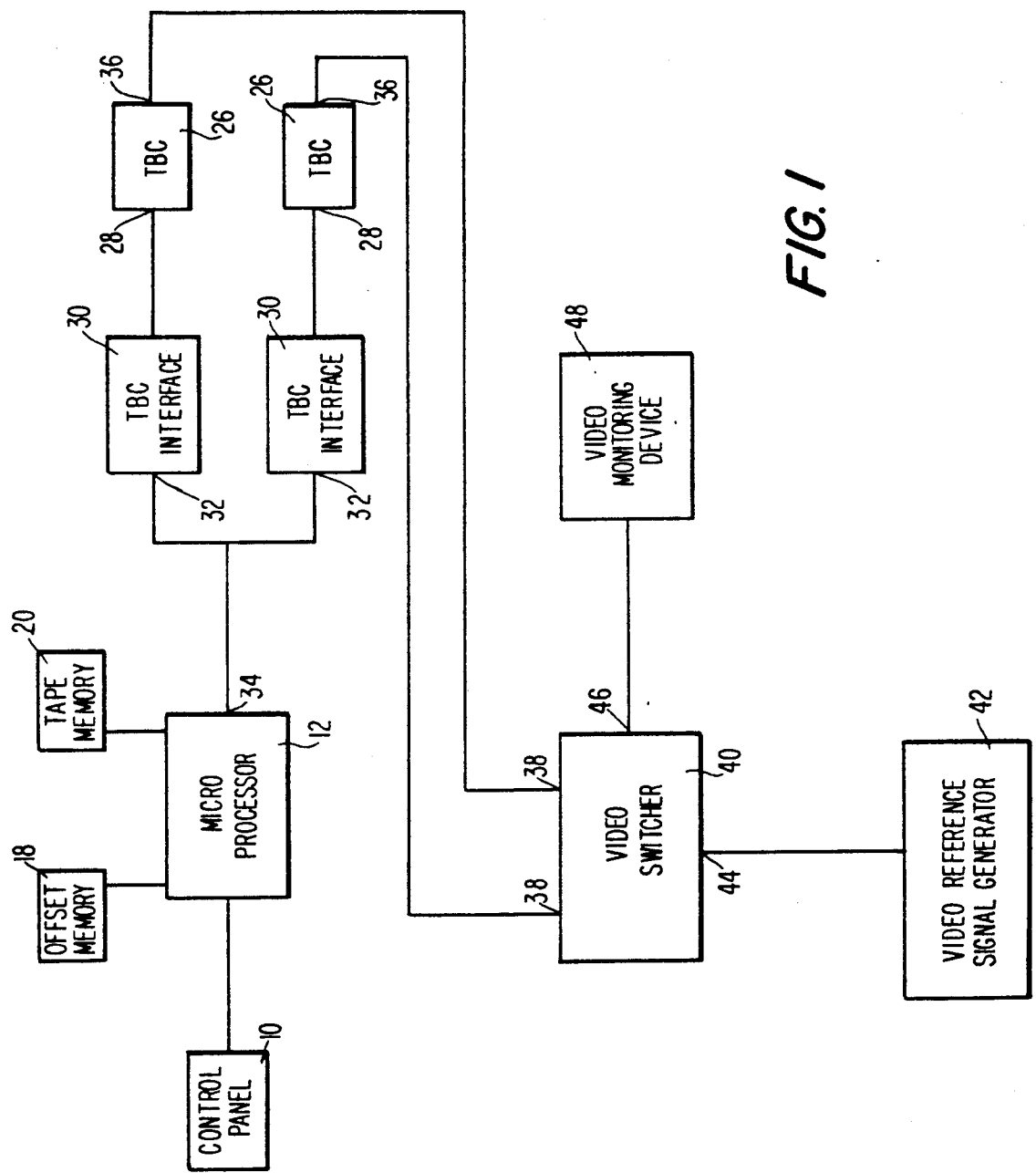
FIG. 1 is a block diagram of the apparatus employed in a preferred embodiment of the invention.

Referring first to FIG. 1, there is shown a control panel 10 which is manufactured and sold in commerce by ZAXCOM VIDEO Corporation of Garfield, N.J. The output of the panel is connected to an input to a micro processor 12. The panel is sometimes sold in combination with this micro processor. The processor 12 receives input signals in digital form and produces output signals in digital form. The processor connected via corresponding leads 14 and 16 to a first offset signal memory 18 and to a second tape memory 20 so that signals from the processor can fed into the memories and data from the memories can be fed into the processor.

A plurality of TBC units 26 having electrical characteristics which differ somewhat from one to another are individually connected at corresponding inputs 28 to corresponding outputs of corresponding interfaces 30 which are either digital or analog interfaces, depending upon the digital or analog type of unit used. Each interface is connected at its input 32 to a corresponding digital output 34 of the processor. The purpose of the interfaces is to insure compatability between the output signals from the processor and the input signals to the unit.

Each unit 26 has a corresponding output 36 connected to a corresponding input 38 of a video switcher 40. A standard reference video signal, containing, for example, color bars at specified gain levels, produced by a video test signal generator of known type 42 is supplied to another input 44 of the switcher. The output 46 of the switcher is a mixed video signal which is supplied to a video monitor 48.

Figure 3:
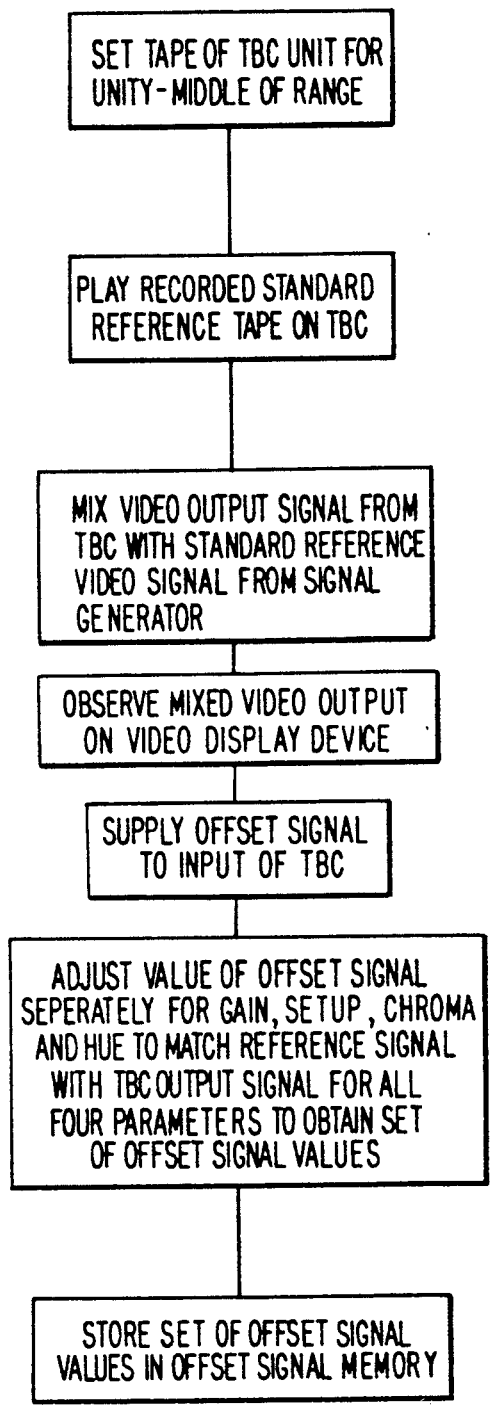
FIG. 3 is a flow chart illustrating the steps employed in the method utilized in a preferred embodiment of the invention to produce offset signal data.

The equipment described above is then first used in the method shown in FIG. 3. Each TBC unit is operated in turn under the control of the panel 10. The tape memory of the selected unit is set to unity, that each of the four parameters is set in the middle of its range. A standard video reference tape is then played on the selected unit. The video output signal of the unit is mixed with the reference video signal in the switcher. The resultant mixed signal output contains both the video output signal and the reference video signal which are displayed side by side in the video monitor. In the ideal case, these two signals would be identical. However, these signals will differ in any unit and will differ from one unit to another. Under the control of the panel, an offset signal is supplied to the unit to adjust the video output signal to be identical to that at the reference video signal. There are four different parameters, video gain, video set up, video chroma and video hue, and a separate offset signal value, which will normally differ one from another for each of the different parameters, is obtained for each parameters. The resultant set of offset signal values are stored by the processor as offset signal data in the offset signal memory, each set being associated with the corresponding TBC unit.

Figure 4:
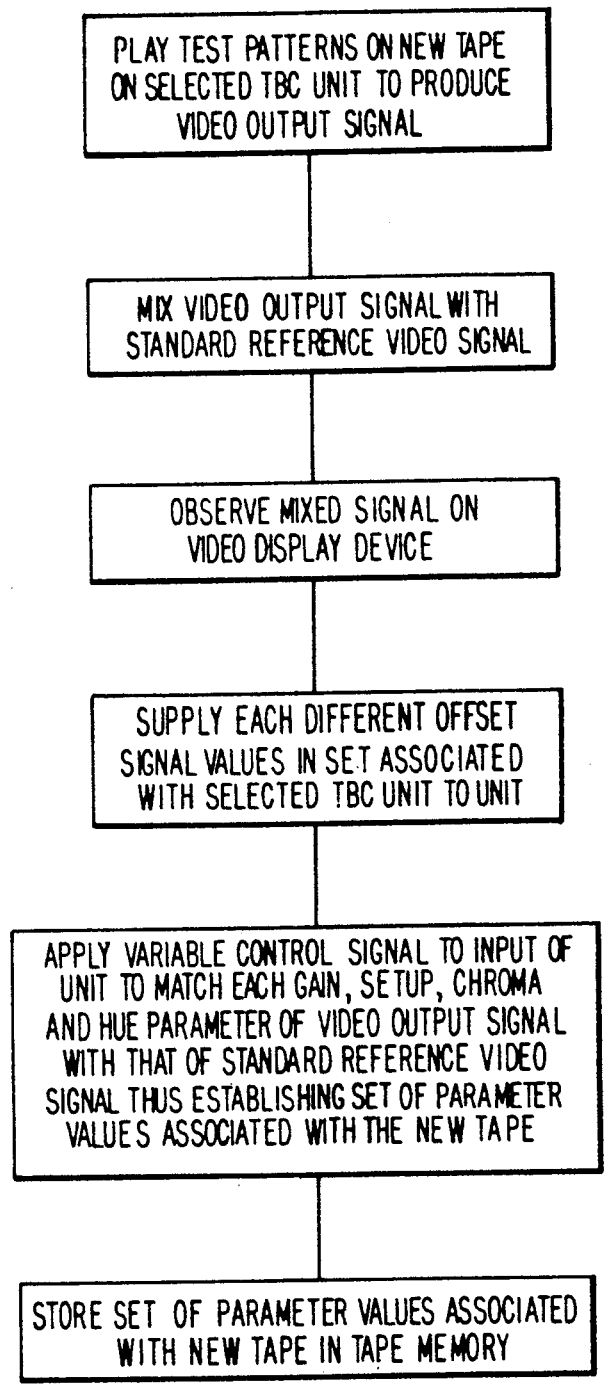
FIG. 4 is another flow chart illustrating the steps employed in the method utilized in a preferred embodiment of the invention to produce stored tape data.

Then, as shown in the chart in FIG. 4, a second tape which contains normal video images and which displays at the very start, video test patterns which identify the parameter values to be used for proper viewing the tape, is played on a selected TBC unit. As before, the test memory of the unit is set to unity and then these test patterns are supplied to the switcher together with the standard reference signal. The processor obtains from the offset signal memory the set of offset signal values associated with the selected unit and applies them to the input of this unit. Each parameter value of the test pattern is then adjusted to be identical to that of the standard reference signal by using the appropriate control on the panel 10. In order to determine the parameter values of the second tape, the offset signal value supplied to the input is combined with the variable parameter value.

In this manner, the resultant set of four parameter values are stored by the processor as tape data in the tape data memory, each set being associated with the corresponding tape. This process is repeated for all tapes to be used.

There are many different mathematical functions which can be used to determine offset signal values. One such function is defined as follows:

$$Y = MX + B$$

where Y is the correct signal level to which all TBC units are to be set; M is a selected offset constant; X is the actual signal level in the absence of an offset signal value; and B is the signal offset value which is to be used with the selected unit. When M is selected to have a value of one, and the correct value is determined as 100 IRE, an offset signal value of +7 IRE will be needed if the actual signal level X of the tape selected has a value of 93 IRE. If the actual signal level X of the tape selected has a value of 107 IRE, then an offset signal value of −7 IRE will be needed.

When M has a value of one, the offset value is obtained by adding a positive or negative offset signal value. The correction may be additive, multiplicative or both, depending upon the characteristics of the tapes.

Figure 2:
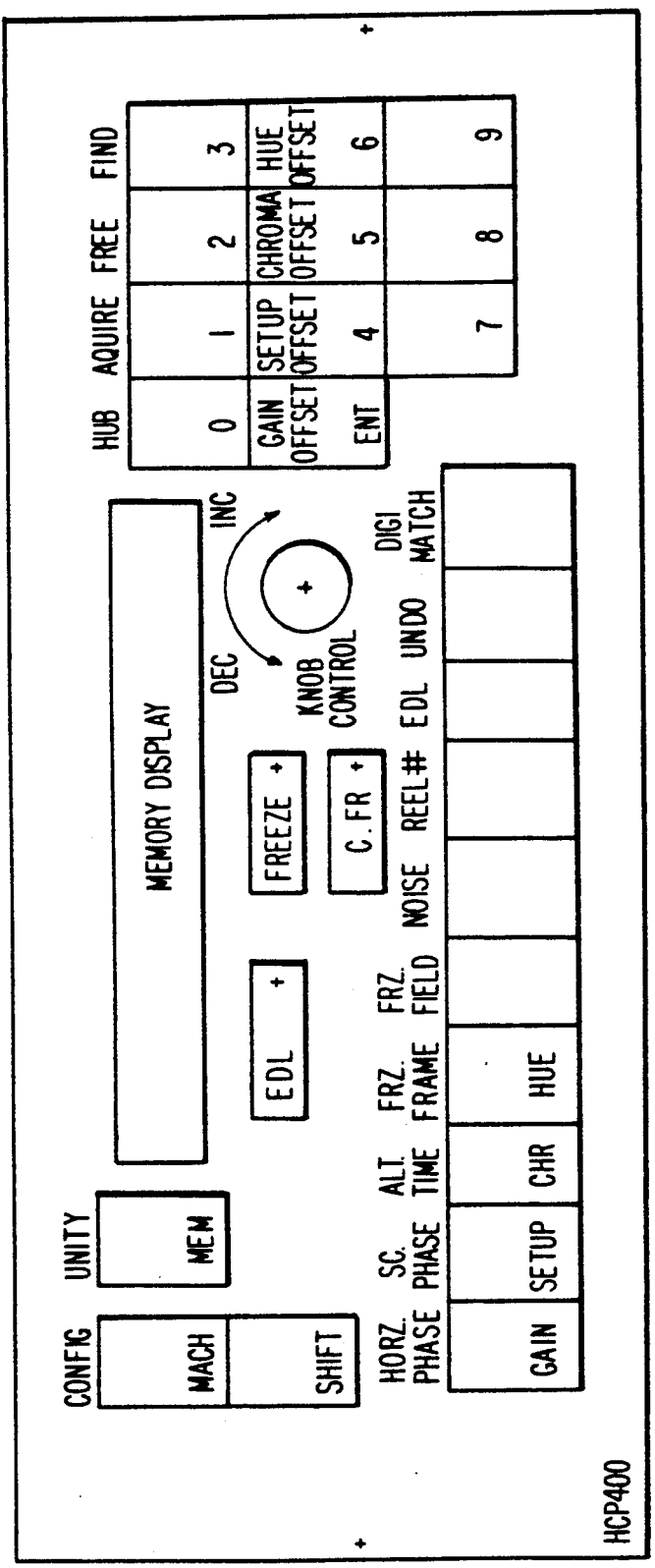
FIG. 2 is a detail view of the face panel of a control unit used in the apparatus of FIG. 2.

The control panel is shown in FIG. 2. The various controls are identified and their functions explained as follows.

GAIN, SETUP, CHR, and HUE,—these buttons respectively select video gain, setup, chroma and hue as the selected parameter to be altered.

The control knob will increment or decrement the parameter being altered. It will also change the memory when the memory [MEM] increment button was the last button pressed.

The memory increment button will step through the fifty memories per TBC. As this button is pressed, the memory number in this group will be displayed in the two digit memory display. Holding this button will result in a continuous increment of the memories. By pressing the memory number on the key pad and then the memory increment button, the memories can be accessed randomly.

Parameters other than those identified above can be dealt with in the same manner as taught herein. Similarly, video processors are controlled in the same manner as TBC units and can be adjusted in the same manner as taught herein.

While the invention has been described with particular reference to the preferred embodiment and to the drawings, the protection sought is to be limited only by the terms of the claims which follow.

What is claimed is:

1. A method employing a standard reference video tape, a source of a standard reference video signal and a source of a variable offset signal and a plurality of time base corrector units, each time base corrector unit being capable of playing a video tape to produce a corresponding video output signal containing four viewing parameters namely video gain, chroma gain, set up and hue, the viewing parameters having values which can be varied, the units having slightly different electrical characteristics so that when each of these units is caused to play the same tape at identical parameter values, the video output signals will differ from unit to unit, said method comprising the steps of:

playing the reference tape in one of the units having parameter values preset for use with this tape, thereby producing a video output signal containing all parameters;

displaying the output signal together with the reference signal, the reference signal containing the same parameters but with different values;

applying an offset signal to the input of said one unit;

varying the offset signal to vary the video output signal for each parameter in turn until the said each parameter of the varied output signal is visually identical to that of the standard reference signal, thereby obtaining a set of offset signal values, each value in the set being associated with a different parameter; and obtaining and storing data in an offset signal memory which is monotonically related to the value of the set of offset signal values producing said visual identity and uniquely identifing the unit with which this set is associated.

2. The method of claim 1 further including the additional steps of:

playing a second tape in said unit, the tape carrying test patterns which identify the different parameter values to be used for proper display to the tape, these patterns being displayed as a video test pattern;

displaying the video test pattern together with the reference signal, the reference signal containing the same parameters but with different values;

applying in succession the different offset signal values in the set of offset signal values associated with said unit to the input of the unit;

in the presence of each of the different offset signal values, applying a variable control signal to the input to vary the parameter value displayed by the video test pattern until this value is identical to the value of the same parameter in the reference signal, thus establishing a set of parameter setting values for the second tape; and obtaining and storing data in a tape memory which is monotonically related to the value of the set of parameter values and uniquely identifies the tape with which this set is associated.

3. The method of claim 1 further including the additional step of repeating the steps of claim 1 for each of the units so that the offset signal memory contains the data for all of the units.

4. The method of claim 2 further including the additional step of repeating the steps of claim 2 for each of the units so that the tape memory contains the stored data for the second tape whereby by accessing the data in the offset signal memory and the tape memory and applying this data when each unit taken in any order is caused to play the second tape, the video output signals produced by any unit will be identical to the video output signals produced by any other unit.

5. The method of claim 2 wherein the additional steps recited in claim 2 are repeated for a plurality of different tapes whereby when any of the different tapes are selected for play in any of the units, the output signals produced by any unit playing any selected tape will be identical to the output signals produced by any other unit playing the same selected tape.

6. The method of claim 1 wherein step is carried out by applying the video signal and the reference signal to a video switcher in order to produce a mixed video signal containing the two signals as separate components and then displaying the two components as a combined visual display.

7. Apparatus for use with a plurality of time base corrector units, each time base corrector unit being capable of playing a video tape to produce a corresponding video output signal containing four viewing parameters namely video gain, chroma gain, set up and hue, the viewing parameters having values which can be varied, the units having slightly different electrical characteristics so that when each of these units is caused to play the same tape at identical parameter values, the video output signals will differ from unit to unit, said apparatus comprising a video switcher having a first input to which each unit output signal can be supplied in turn and a second input to which a standard reference signal containing the same parameters but at different values can be supplied, the switcher having an output at which both the unit output signal and the reference signal appear as a mixed video signal;

first means to supply an output signal from one of the units playing a standard reference tape to said first input;

second means to supply said reference signal to said second input;

a display device having an input coupled to the output of the switcher and responsive to the mixed signal to display same as a composite;

third means for producing an offset signal variable in value and for supplying said offset signal to the input of the said unit, said third means having a control for varying the value of the offset signal, the offset value being adjusted for each parameter in turn to set the parameter value of the unit output signal to be identical to the value of the same parameter contained in the reference signal; and fourth means responsive to the set of offset signal values yielded by the third means to obtain and store data monotonically related thereo which uniquely identifies the said unit.

8. Apparatus for use with a plurality of time base corrector units, each time base corrector unit being capable of playing a video tape to produce a corresponding video output signal containing four viewing parameters namely video gain, chroma gain, set up and hue, the viewing parameters having values which can be varied, the units having slightly different electrical characteristics so that when each of these units is caused to play the same tape at identical parameter values, the video output signals will differ from unit to unit, said apparatus comprising:

a video switcher having a first input to which each unit output signal can be supplied in turn and a second input to which a standard reference signal containing the same parameters but at different values can be supplied, the switcher having an output at which both the unit output signal and the reference signal appear as a mixed video signal;

first means to supply an output signal from one of the units playing a test pattern containing the values of the said parameters required for proper display of the tape to said first input;

second means to supply said reference signal to said second input;

a display device having an input coupled to the output of the switcher and responsive to the mixed signal to display same as a composite;

third means for producing a set of offset signal values which are uniquely associated with said unit, each value being associated with a different parameter and for supplying each of the values in said set in turn to the input of said unit, said third means having a control for varying the value of the corresponding parameter contained in the displayed test pattern, the value being adjusted for each parameter in turn to set the parameter value of the displayed test pattern to be identical to the value of the same parameter contained in the reference signal; and fourth means responsive to the set of values of the different parameters yielded by the third means to obtain and store data monotonically related thereto which uniquely identifies the corresponding tape.

* * * * *